United States Patent [19]
Plager et al.

[11] Patent Number: 6,047,906
[45] Date of Patent: Apr. 11, 2000

[54] NON-DRIP DISPENSING NOZZLE

[75] Inventors: Steven P. Plager, Eden Prairie; David L. Breeser, Excelsior; Gerald J. Grams, Elk River, all of Minn.

[73] Assignee: Graco Inc, Minneapolis, Minn.

[21] Appl. No.: 09/121,403

[22] Filed: Jul. 23, 1998

[51] Int. Cl.[7] .................................................. F02M 59/00
[52] U.S. Cl. ........................................................ 239/533.2
[58] Field of Search ............................. 239/533.2, 533.3, 239/533.8, 533.9; 137/514.5, 494

[56] References Cited

U.S. PATENT DOCUMENTS

| | | | |
|---|---|---|---|
| 1,363,470 | 12/1920 | Knudsen | 239/533.8 |
| 2,927,604 | 3/1960 | Johnson | 137/514.5 |
| 3,282,512 | 11/1966 | Bluhm et al. | 239/533.8 |

FOREIGN PATENT DOCUMENTS 317076 7/1929 United Kingdom ................ 299/107.6

*Primary Examiner*—Andres Kashnikow
*Assistant Examiner*—Davis Hwu
*Attorney, Agent, or Firm*—Douglas B. Farrow

[57] ABSTRACT

The nozzle is designed for fitting on the end of a metered dispense valve which is used in fluid delivery systems such as lubricant dispensers for use in vehicle servicing and the like. The device in this application accommodates thermal expansion between the meter and nozzle by providing an air pocket which may absorb the thermal expansion.

4 Claims, 3 Drawing Sheets

NON-DRIP DISPENSING NOZZLE

BACKGROUND OF THE INVENTION

Non-drip nozzles have been used in conjunction with dispensing valves for dispensing lubricants and the like for many years. When flow is stopped at the end of the nozzle, a volume of fluid is trapped in the dispense tube between the meter/dispense valve and nozzle. If the temperature rises, the volume of this fluid can slowly expand with the result that either fluid will push out of a spring-loaded valve seat at the nozzle or cause damage to the meter and valve itself.

SUMMARY OF THE INVENTION

In the preferred embodiment, the nozzle houses an internal air spring that compresses sufficiently to compensate for the additional volume caused by expanding fluid. For reasonable temperature swings, the expanding fluid will not produce enough pressure to open the valve stem and release fluid.

In the preferred embodiment, a nozzle stem slides back and forth inside the housing to open and close the end of the nozzle. An air-spring cup which slides on the end of the nozzle stem is sealed with an o-ring and contains a pocket of air that expands a n d contracts as pressure inside the nozzle changes. A spring holds the stem in the closed position until the pressure inside the nozzle is sufficient to open the stem against the spring force thus allowing fluid to flow out the end of the nozzle.

When the metered dispense valve is open, fluid enters the nozzle from the inlet port and pressure builds inside. As pressure builds inside the nozzle, the nozzle stem opens and allows fluid to flow out the end of the nozzle and when dispensing is ceased, the pressure inside the nozzle stops allowing the spring to force the nozzle closed.

The key to this design is to allow the air-spring to re-expand or reset after fluid has been dispensed. The design of the nozzle stem is such that the pressure required to open the nozzle is much higher than the pressure inside the nozzle after it is closed. This assures that the air-spring is always reset and ready to compensate for thermal expansion of the fluid.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

DESCRIPTION OF THE PREFERRED EMBODIMENT

Figure 4:
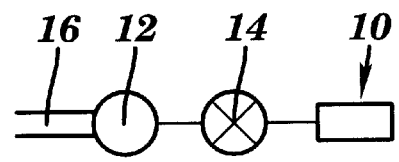
FIG. 4 is a schematic view of the nozzle in conjunction with the dispense valve of the instant invention.

The nozzle 10 of the instant invention is generally shown in schematic form in FIG. 4 and is designed to be attached to the end of a dispense meter 12 and valve 14 combination (this also may be a simple valve 14 which is attached to a pressurized source of fluid 16).

Nozzle 10 is comprised of a small number of parts. Nozzle stem 18 slides back and forth in housing 20 to open and close the end 18A of the nozzle which seats against o-ring seal 22. An air-spring cup 24 is slideably mounted over the upper end 18B of nozzle stem 18 and is sealed there by o-ring seal 26. Air-spring cup 24 provides an air pocket 28 between cup 24 and stem 18. Pocket 28 expands and contracts as the pressure inside the nozzle changes. Spring 30 holds the stem 18 in a closed position until pressure inside the nozzle is sufficient to open the stem against the spring force allowing fluid to be dispensed out of the end 20A of nozzle 10.

Figure 1:
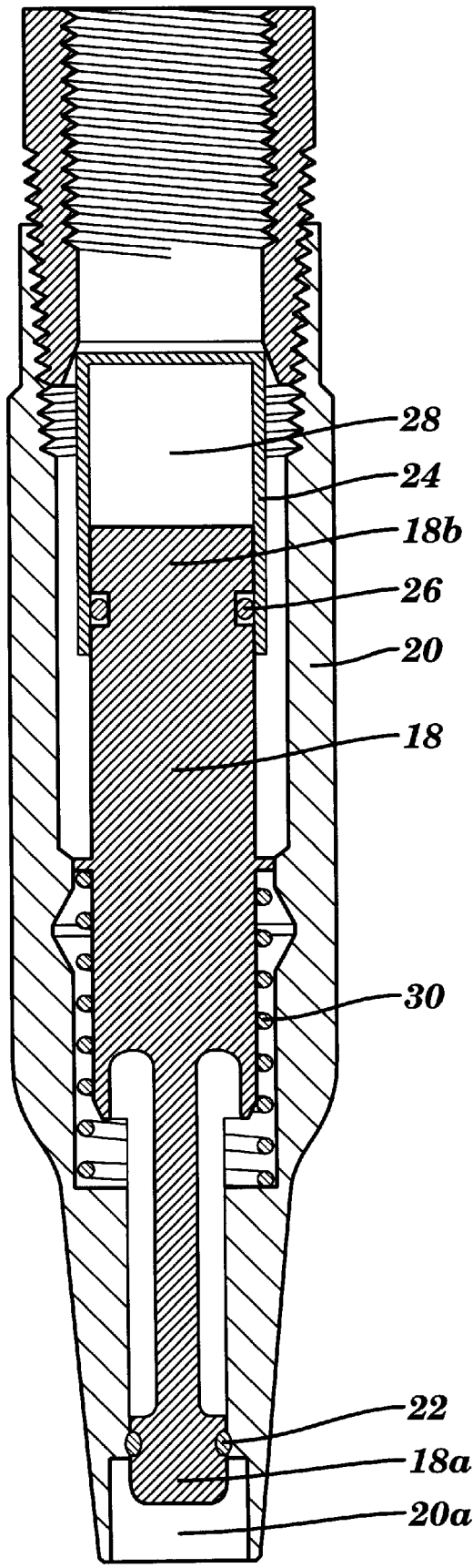
FIG. 1 is a cross-sectional view of the instant invention.
Figure 2:
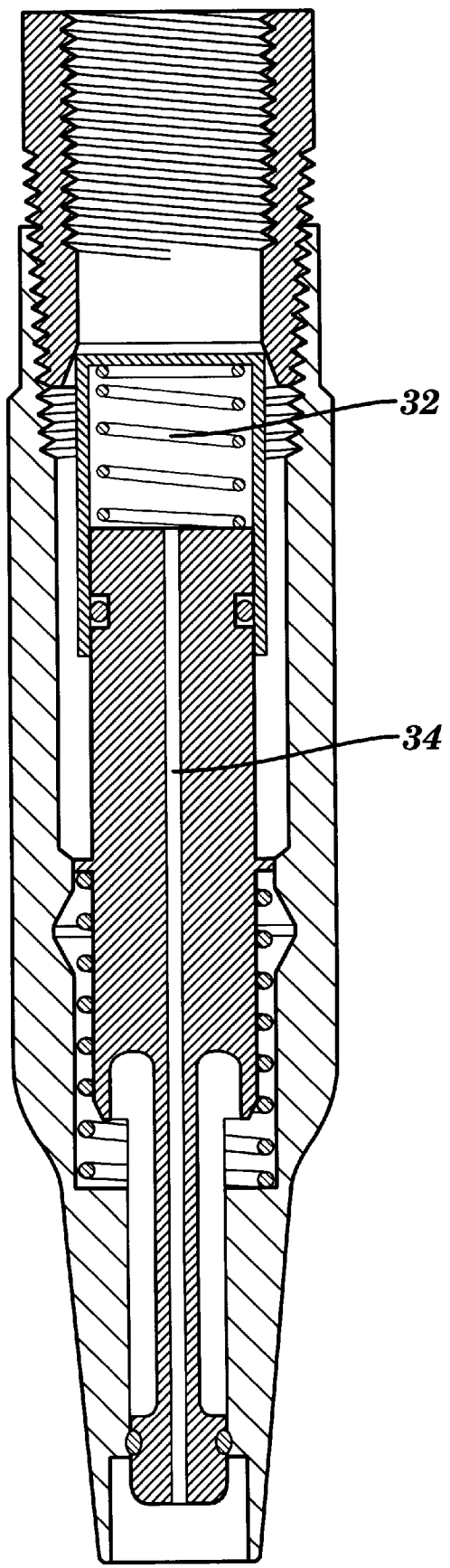
FIG. 2 is a cross-sectional view of an alternative embodiment of the instant invention.

An alternative design is shown in FIG. 2 and allows a spring 32 to be placed between the air-spring cup and nozzle stem to maintain the air pocket and a vent hole 34 is provided down the stem to allow the pocket to be vented to the outside air.

Figure 3:
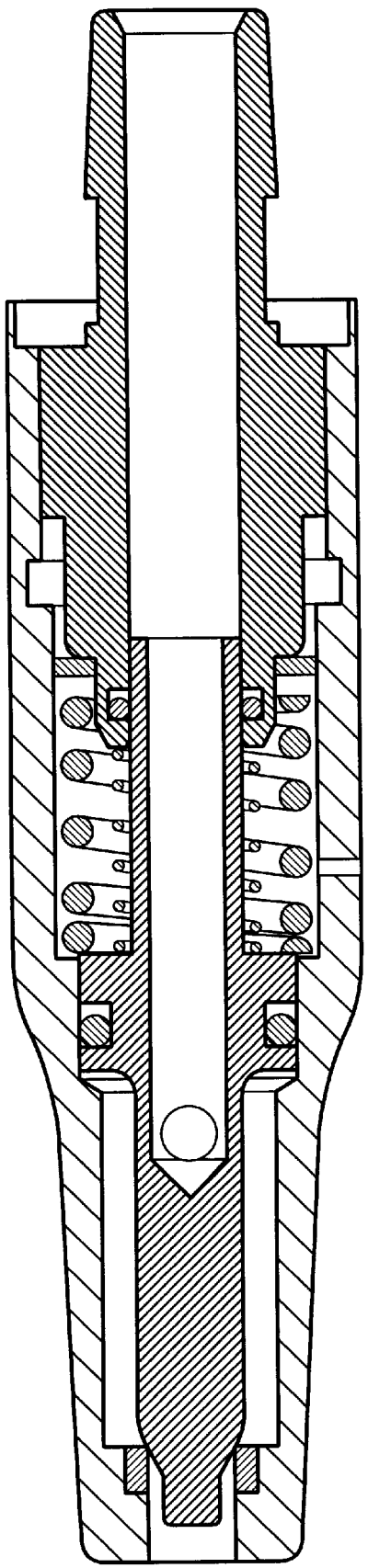
FIG. 3 is a cross-sectional view of yet another alternative embodiment of the instant invention.

In another alternative embodiment shown in FIG. 3, the fluid flow is directed toward the mid-section of the nozzle stem and fluid pressure is employed to push the stem in the direction opposite the fluid flow in order to open the nozzle stem. The location of the air-spring does not necessarily need to be in the nozzle housing itself. By using an air-spring or other such device it can be located in the nozzle tube or as a separate mechanism fitted in the fluid path between the dispense valve and the nozzle.

The key to operability of the nozzle is that is allows an opening pressure that is significantly higher than the closing pressure. This difference in pressure allows the air-spring to reset after each dispense. Various embodiments accomplish this task by using different methods to accomplish the same result. Another method would be to cause a delay in the closing of the valve stem which would thus allow the pressure in the nozzle to dissipate thus allowing the air-spring to reset.

It is contemplated that various changes and modifications may be made to the nozzle without departing from the spirit and scope of the invention as defined by the following claims.

What is claimed is:

1. A nozzle for dispensing a pressurized fluid subject to thermal expansion, said nozzle comprising:

a housing;

a stem having a discharge end and an upper end and slideably located in said housing;

a mechanical spring mounted between said stem and said housing and biasing said stem to a closed position; and an air-spring cup slideably mounted over said upper end of said nozzle stem to provide an air pocket between said cup and said stem for accommodating expanding fluid volume due to temperature chances.

2. The nozzle of claim 1 further comprising a spring holding said stem in a closed position until pressure inside said nozzle is sufficient to open said stem against the spring force allowing fluid to be dispensed.

3. The nozzle of claim 1 further comprising a vent passage through said stem between said air pocket and atmosphere.

4. The nozzle of claim 3 further comprising a spring biasing said cup away from said stem.

* * * * *